(12) United States Patent
Wehoski

(10) Patent No.: US 6,636,146 B1
(45) Date of Patent: Oct. 21, 2003

(54) CONTACTLESS COMMUNICATION SYSTEM FOR EXCHANGING DATA

(75) Inventor: Frédéric Wehoski, Gretz Armainvillers (FR)

(73) Assignee: Régie Autonome des Transports Parisiens, Paris (FR)

( * ) Notice: Subject to any disclaimer, the term of this patent is extended or adjusted under 35 U.S.C. 154(b) by 0 days.

(21) Appl. No.: 09/194,809

(22) PCT Filed: Dec. 8, 1997

(86) PCT No.: PCT/FR97/02229

§ 371 (c)(1),
(2), (4) Date: Dec. 3, 1998

(87) PCT Pub. No.: WO98/26370

PCT Pub. Date: Jun. 18, 1998

(30) Foreign Application Priority Data

Dec. 10, 1996 (FR) .............................................. 96 15163

(51) Int. Cl.[7] .............................................. H04Q 5/22
(52) U.S. Cl. ..................................... 340/10.4; 340/10.5
(58) Field of Search ................................ 340/10.3, 10.4, 340/825.72, 825.77, 10.2, 10.42; 342/195, 51; 323/220; 380/28

(56) References Cited

U.S. PATENT DOCUMENTS

| 4,631,708 | A | * | 12/1986 | Wood et al. ...................... 367/2 |
| 5,045,770 | A | * | 9/1991 | Brooks .......................... 323/223 |
| 5,302,954 | A | * | 4/1994 | Brooks et al. .................. 342/44 |
| 5,450,492 | A | * | 9/1995 | Hook et al. .................... 380/28 |
| 5,701,121 | A | * | 12/1997 | Murdoch .................... 340/10.3 |

* cited by examiner

Primary Examiner—Michael Horabik
Assistant Examiner—William Bangachon
(74) Attorney, Agent, or Firm—Nixon & Vanderhye, PC

(57) ABSTRACT

The terminal includes a coil co-operating with a data transmitter/receiver. The portable object includes a remotely powered electric circuit including: a coil for picking up the modulated magnetic field from the terminal or for responding by producing modulated disturbance of the magnetic field; a converter including a rectifier stage and a filter stage transforming the magnetic field picked up by the coil into a DC power supply voltage; and a data transmitter/receiver, the receiver including a demodulator for demodulating the amplitude of the signal picked up by the coil, the amplitude demodulator operating on the signal output by the rectifier and filter stages. Each of the coils forms a portion of a tuned resonant circuit radiating the field in free space. The amplitude modulation is a low depth modulation, with a modulation ratio that is typically less than or equal to 50%.

10 Claims, 6 Drawing Sheets

CONTACTLESS COMMUNICATION SYSTEM FOR EXCHANGING DATA

The invention relates to techniques for contactless communication between a portable object and a terminal.

Contactless data exchange is well known; applications of this technique include, in a non-limiting manner, controlling access, electronic payment ("electronic purse" type applications), and remote payment, e.g., for access to and payment of public transport.

In the latter example, each user is provided with a portable object of the "contactless card" or "contactless badge" type, which object is suitable for exchange information with a fixed (or possibly moving) terminal by bringing the badge close to the terminal so as to enable non-metallic mutual coupling to take place therebetween (the term "terminal" is used in the present description to designate the data transmitter/receiver apparatus suitable for co-operating with the portable objects).

More precisely, the coupling is performed by varying a magnetic field produced by an induction coil (the technique known as the "induction method"). To this end, the terminal includes an inductive circuit excited by an alternating signal which produces an alternating-magnetic field in the surrounding space. When in said space, the portable object detects the field and responds by modulating the load constituted by the portable object coupled to the terminal; this variation is detected by the terminal, thereby establishing the looked-for both-way communication.

The invention relates to the particular case of a portable object that is a remotely-powered portable object, i.e., it takes its power from the magnetic energy emitted by the terminal, and more precisely the invention relates to the case where the remote power is picked up by the portable object using the same coil as that which is used for the communication function.

The invention also relates to the case where information is transmitted from the terminal to the portable object by amplitude modulation; in which case the portable object includes means for demodulating the amplitude of the signal picked up by the coil.

U.S. Pat. No. 4,650,981 describes a contactless communications system of that type in which the portable object is placed in the air gap of a magnetic circuit of the terminal, coupling being achieved when the user inserts the portable object in a read slot of the terminal. The coil of the portable object is thus placed in the magnetic circuit of the terminal, thereby ensuring the looked-for coupling, with information being transmitted in both directions between the terminal and the portable object, and with the portable object being remotely powered from the magnetic energy produced by the terminal. To this end, the portable object includes a single coil that picks up the magnetic field from the terminal and that is associated with converter means (for rectifying and filtering) to enable a DC power supply voltage to be produced, and also with amplitude demodulator means operating downstream from the converter means in order to extract the information content from the signal radiated by the terminal.

One of the objects of the present invention is to provide a contactless data exchange technique of the above-mentioned type, but which is usable with a magnetic field that is radiated into free space, i.e., when the portable object is merely present in a predetermined volume around the coil of the terminal, at an arbitrary orientation and at a distance from the coil that can vary: the purpose is to be able to establish contactless communication with "hands-free" type terminals (e.g. when passing through an inspection gate) or with terminals where the user is asked merely to bring the badge into a read zone of small size or to place the badge against such a zone, but at any orientation and with a certain amount of geometrical latitude between the terminal and the portable object.

Under such circumstances, remote powering suffers from the drawback of depending on the surrounding magnetic field, which can vary very greatly given the close or remote proximity of the portable object to the terminal. Such very large variations in magnetic field, once rectified and filtered, give rise to very large variations in the power supply voltage for the portable object, which variations must be eliminated by means of a suitable stabilizer stage.

Another drawback of remote powering lies in possible interference between variations in the power supply voltage (due to variations in the mean level of the magnetic field as a function of the distance between the object and the terminal or due to erratic variations in the amount of current consumed) and the modulation of the magnetic field, when said modulation is amplitude modulation: interfering or minor variations can thus be wrongly interpreted as signal modulation, with the consequence of introducing transmission errors.

Conversely, when the object is transmitting signals to the terminal, modulation by varying the load of the tuned circuit implies forced variation in the amount of current consumed by the portable object, and that has repercussions on the general power supply to the circuits of the object, with the danger of the object being under-powered during certain stages of the modulation.

As shown above, remotely powering a portable object by a magnetic field is not without drawbacks (these aspects are explained in the detailed description), and until now that has limited the use of this technique in spite of its advantages, or has restricted it to highly specific applications, for example when the distance between the terminal and the object is small and constant, as is the case in above-mentioned U.S. Pat No. 4 650 981, which is generally not the case of remote payment applications.

An object of the invention is to remedy those various drawbacks by proposing a contactless communications system between a terminal and a remotely powered portable object, enabling the electronic circuits of the object to be powered in complete safety, without any risk of interference, and with optimum management of the power received from the terminal and picked up by the portable object.

Another object of the invention is to be able to allow synchronous type communication between the terminal and the portable object, i.e., communication in which the operation of the card is clocked by a clock signal defined by the terminal. This technique is commonly used with cards that have contacts (ISO standard 7816-3 specifically providing a series of contacts for transmitting the clock signal in the event of synchronous communication), however, in spite of its clear advantages, this technique is not often used in contactless systems because of the difficulties involved in transmitting clock signal information from the terminal to the portable object.

The system of the invention is of the above-mentioned general type taught by above-mentioned U.S. Pat. No. 4,650,981, it is a system in which the terminal includes: a coil suitable for emitting a magnetic field; data transmission means co-operating with the coil and comprising alternating signal generator means and amplitude modulator means; and data reception means co-operating with the coil. The portable object includes an electric circuit that is remotely powered by the terminal, and comprising: a coil for picking up said modulated magnetic field coming from the terminal or for producing a response by modulated disturbance of the magnetic field; converter means co-operating with the coil of the portable object to transform the magnetic field picked up thereby into a DC voltage for powering the circuit of the object, said means comprising a rectifier stage and a filter stage; and data transmission means and data reception means also co-operating with the coil of the portable object, the data reception means including means for demodulating the amplitude of the signal picked up by the coil, said amplitude demodulator means operating on the signal delivered at the output from the rectifier and filter stages.

The system is characterized in that each of said coils forms a portion of a tuned resonant circuit radiating the field in empty space; and the amplitude modulation of the magnetic field emitted by the terminal is modulation at low depth, with a modulation ratio that is typically less than or equal to 50%.

The invention also relates to the portable object and to the terminal of the above-specified system, considered as independent characteristic entities.

According to various advantageous subsidiary characteristics of the invention:
the modulation ratio is less than 20%;
the amplitude modulator means are variable threshold means comparing the instantaneous value of the signal applied to the input thereof with a mean value of the same signal;
the amplitude demodulator means are means sensitive to the rate at which the instantaneous value of the applied signal increases;
the converter means further comprise, downstream from the rectifier and filter stages, a stabilizer stage including a shunt regulator element mounted in parallel with the circuit to be powered between its power supply terminals and associated with a resistive component connected in series in the power supply line of the circuit, the shunt regulator element taking off a variable fraction of the power supply current for the circuit so that the resistive element and the shunt regulator element dissipate any excess power that is not required for operation of the circuit, in such a manner that, correspondingly, the power supply voltage at the terminals of the circuit is stabilized, the voltage excursion at the terminals of the upstream tuned element is limited, and variations in current consumption are prevented from having an influence upstream on the amplitude of the signal to be demodulated;
the portable object comprises means for selectively and temporarily inhibiting operation of the shunt regulator; in which case means are preferably provided for detecting the type of communication, contactless or via contacts, and in which the selective and temporary inhibition of the operation of the shunt regulator is implemented in response to detecting communication of a type that passes via contacts;
the entire electronic circuit with the exception of the coil of the tuned element is implemented in integrated monolithic technology; and
the data transmitter means are means that operate by modulating current consumption downstream from the tuned circuit, and the circuit is capable of operating in two power consumption modes, with nominal power consumption and with low power consumption, means being provided for putting the circuit into low power consumption mode before the data transmission means begin to perform said modulation.

There follows a detailed description of an embodiment of the invention given with reference to the accompanying drawings in which the same numerical references designate elements that are identical or functionally similar.

Figure 2:
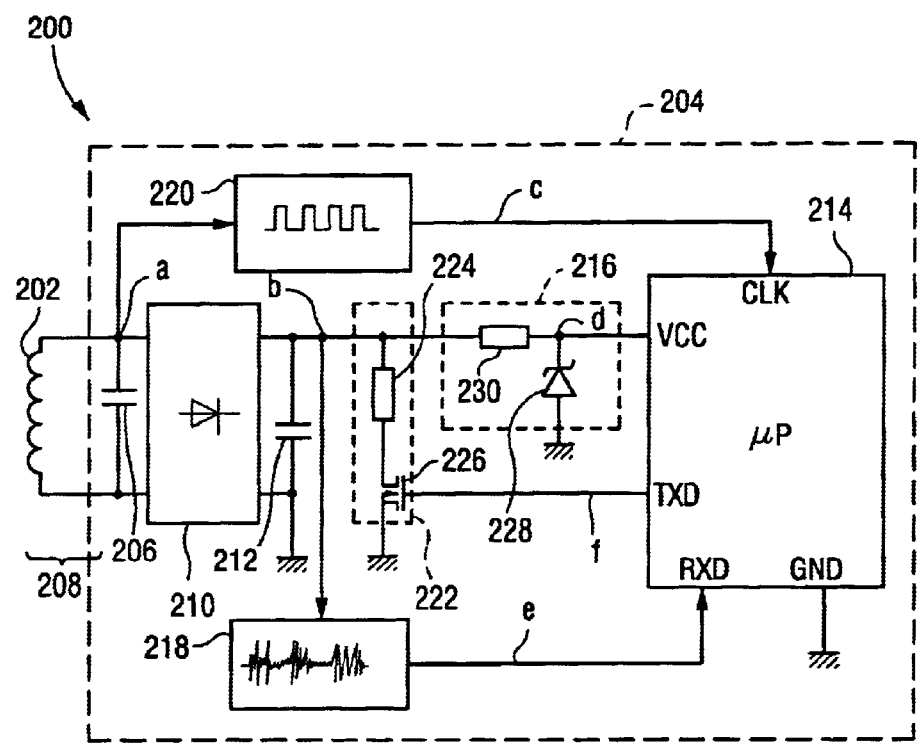
FIG. 2 shows an examplary embodiment of the present invention of the portable object of FIG. 1.
Figure 4:
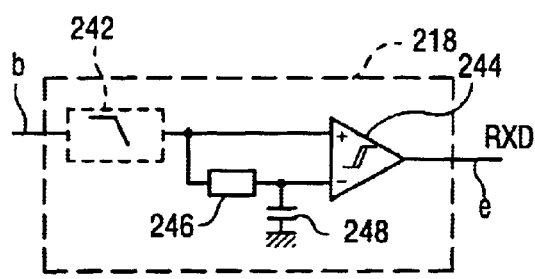
Figure 5:
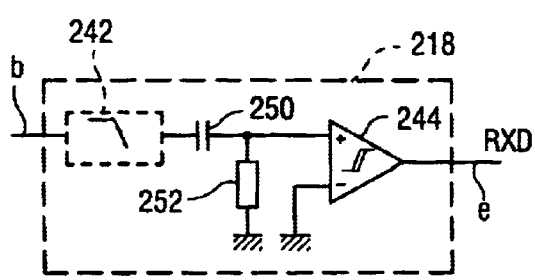

FIGS. 4 and 5 each show an examplary embodiment show of the demodulator circuit of the present invention as shown FIG. 2.

Figure 6:
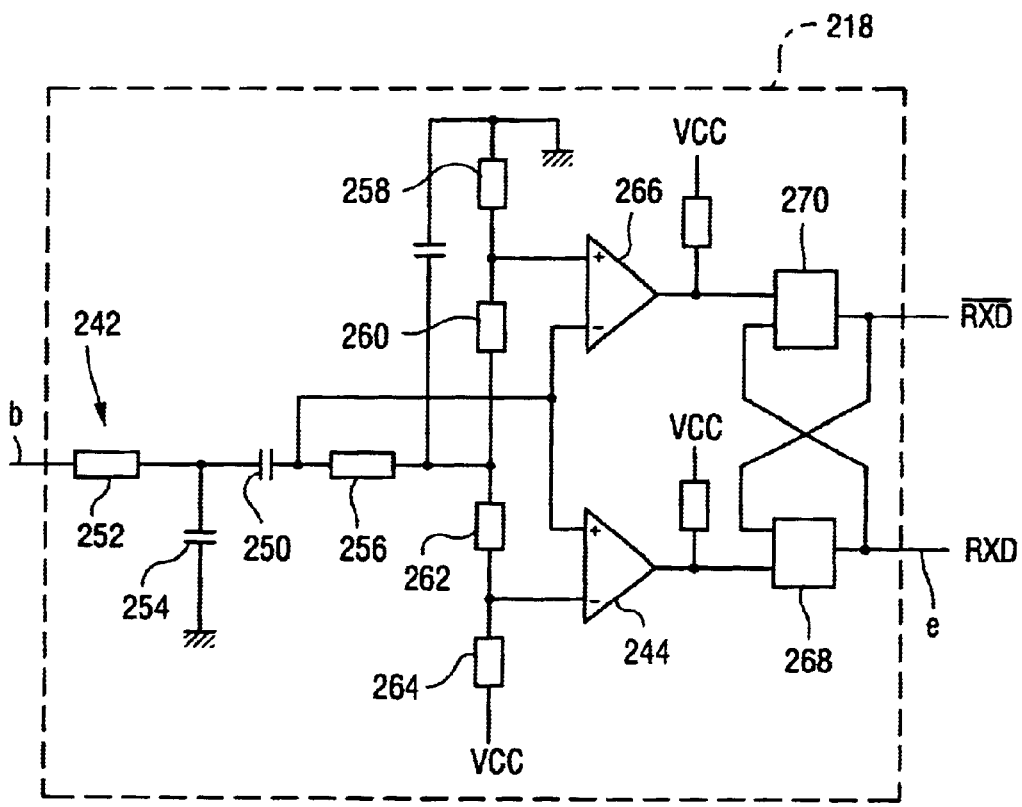

FIG. 6 is an exemplary embodiment of a detailed diagram of the FIG. 5 demodulator circuit of the present invention.

Figure 7:
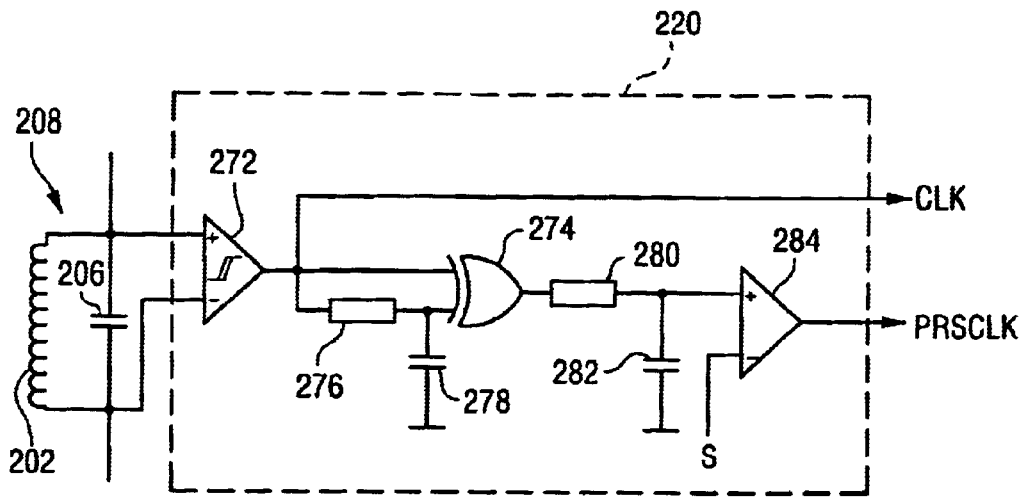

FIG. 7 shows the clock extractor circuit of FIG. 2 of the present invention.

Figure 8:
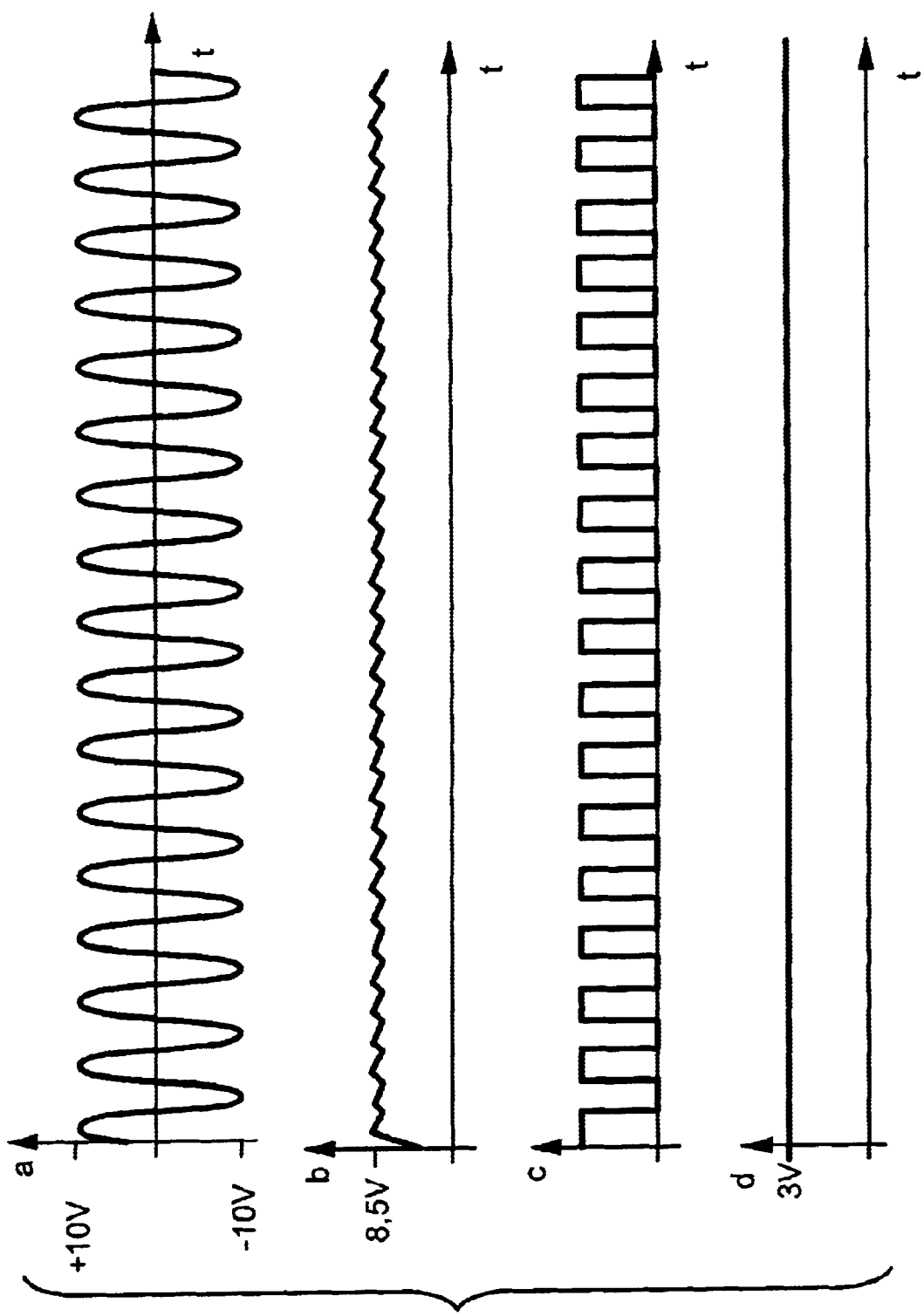

FIG. 8 shows an exemplary embodiment a set of waveform diagrams of the present invention showing how the portable object is remotely powered and how the clock signal is extracted.

Figure 9:
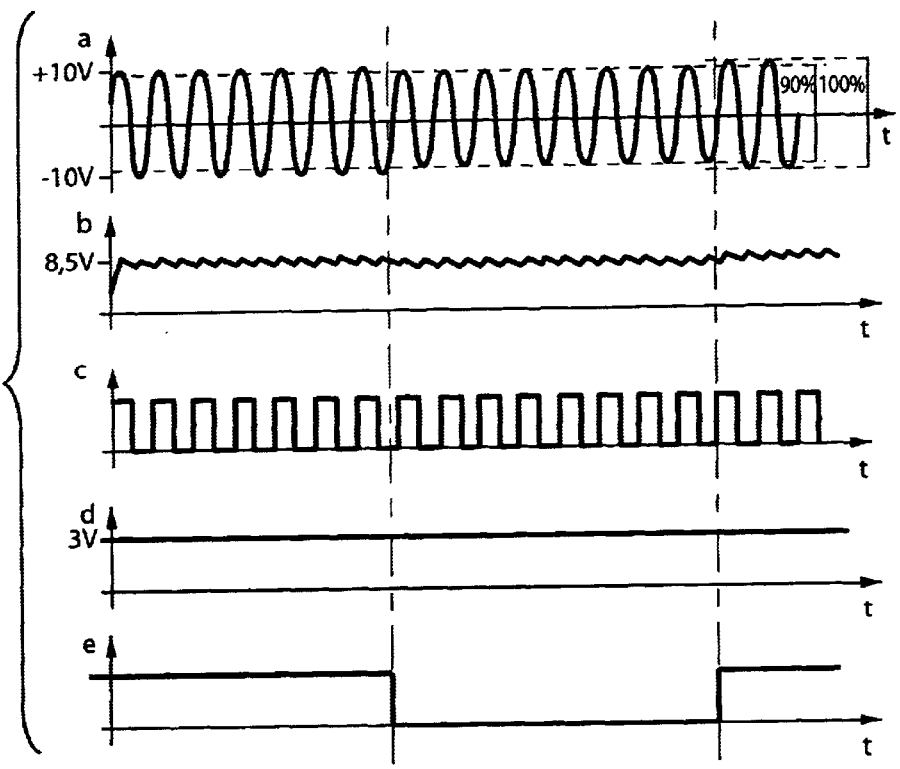

FIG. 9 is a set of waveform diagrams explaining how information is transmitted from the terminal to the object.

Figure 10:
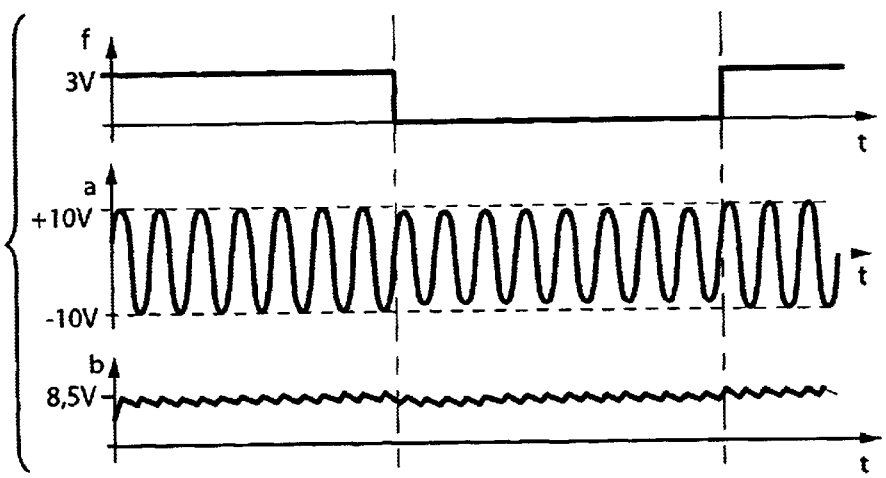

FIG. 10 is a series of waveform diagrams explaining how information is transmitted from the object to the terminal.

Figure 11:
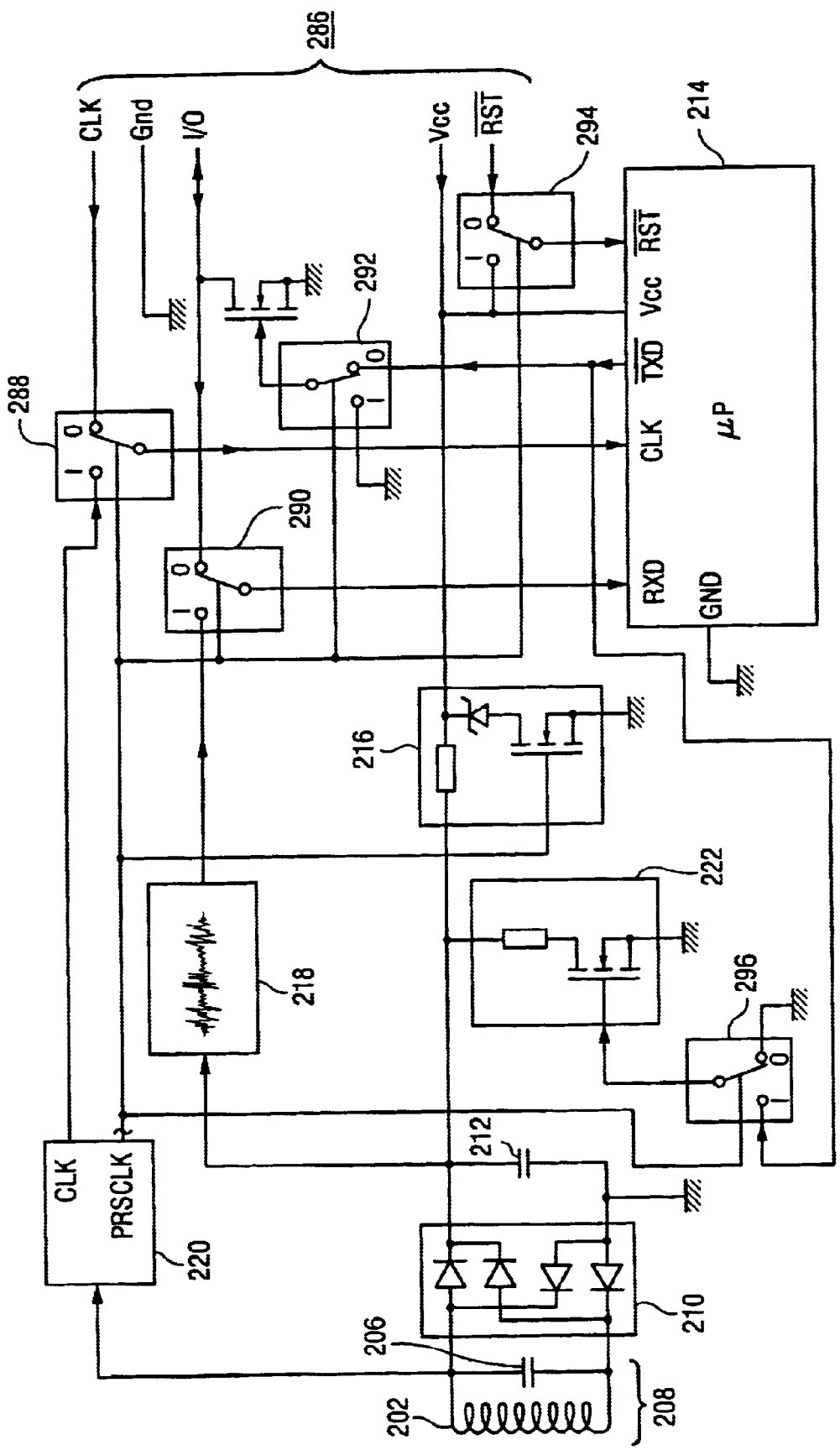

FIG. 11 shows an exemplary embodiment of the various switching operations of the present invention performed in a dual-mode card between its two modes of operation: contacts and contactless.

An exemplary embodiment of the system of the present invention is described with reference to the diagram of FIG. 1. In this diagram, reference 100 designates a terminal which can be coupled to a portable object 200 placed in the vicinity thereof.

The terminal includes a transmitter coil 102 which, in association with a capacitor such as 104, forms a tuned circuit 106 designed to generate a modulated magnetic induction field. The frequency to which the circuit 106 is tuned may be 13.56 MHz, for example, which value is naturally not limiting, this particular choice stemming from the fact that it corresponds to a value authorized by European standards for communications and remote powering functions. In addition, this relatively high value makes it possible to design circuits having coils that possess few turns, and that are therefore easy and cheap to implement.

The tuned circuit 106 is powered by a sustained-wave high frequency oscillator 108 and it is modulated by a mixer stage 110 driven by the signals to be transmitted TXD coming from a digital circuit 112. The operation of the circuit 112, and in particular the sequencing of the signals TXD is clocked by a circuit 114 producing a clock signal CLK.

Receiver stages which extract received data RXD from the signal picked up across the terminals of the coil 102 comprise a high frequency demodulator circuit 116 together with a subcarrier demodulator circuit 118 when, in the manner described below, it has been decided to use subcarrier modulation in the direction portable object→terminal (this technique naturally not being limiting in any way, modulation could equally well be performed in baseband).

The portable object 200 includes a coil 202 co-operating with an electronic circuit 204 which, advantageously, is implemented in fully integrated monolithic technology so as to enable the object to be small in size, typically having the format of a "credit card". By way of example, the coil 202 is a printed coil and the set of circuits 204 is implemented in the form of an application specific integrated circuit (ASIC).

The coil 202 co-operates with a capacitor 206 to form a resonant circuit 208 tuned to a given frequency (e.g. 13.56 MHz) enabling data to be interchanged in both directions with the terminal by the so-called "induction" technique and also enabling the object to be remotely powered by the magnetic field picked up by the coil 202, i.e., by the same coil as the coil used for interchanging information.

The alternating voltage a picked up across the terminals of the tuned circuit 208 is applied to a half-wave or full-wave rectifier stage 210 followed by a filter stage 212 to deliver a filtered rectified voltage b.

The portable object also includes a digital processing stage 214, typically implemented on the basis of a microprocessor, RAM, ROM, and EPROM memories, and interfacing circuits.

Downstream from the rectifier and filtering stages 210 and 212 there are connected in parallel various specific stages comprising:

A voltage-stabilizing regulator stage 216 delivering at its output a DC voltage d that is rectified, filtered, and stabilized, which is applied in particular to the positive power supply terminal VCC of the digital circuit 214 whose other power supply terminal is ground GND. This stabilizer stage 216 can be a conventional type of voltage stabilizer or, in a non-limiting variant, a specific circuit as described below with reference to FIGS. 2 and 3.

A demodulator stage 218 receiving the signal b as its input and delivering at its output a demodulated signal e which is applied to the dat input RXD of the digital circuit 214. This demodulator can, in particular, be a demodulator that detects variations in amplitude and/or with a variable threshold, as explained in greater detail below with reference to FIGS. 4, 5, and 6.

A clock extractor stage 220 whose input receives the signal a picked up from the terminals of the tuned circuit 208 and whose output delivers a signal c applied to the clock input CLK of the digital circuit 214.

The clock extractor stage 220 can be located either upstream from the rectifier and filter stages 210 and 212, as shown, or else downstream from the stages, i.e., it can operate on the signal b instead of the signal a; nevertheless, it is less advantageous to use the signal b insofar as the clock extractor then needs to have greater sensitivity in order to compensate for the smoothing of the signal as performed by the filter stage.

A modulator stage 222 which operates in conventional manner by "load modulation", a technique which includes in causing the current drawn by the tuned circuit 208 that is situated in the surrounding magnetic field generated by the terminal to vary in a controlled manner. The modulator circuit 222 comprises a resistive element 224 (a separate resistor component or, in monolithic technology, a MOS type component having no grid and acting as a resistance) connected in series with a switch element 226 (MOS transistor) controlled by the modulation signal f present on the output TXD of the digital circuit 214. In a variant, instead of being placed downstream from the rectifier and filter circuits 210 and 212, the modulator stage 222 may equally well be placed upstream from said circuits, as shown at 222' in FIG. 1, i.e., it may be connected directly to the terminals of the resonant circuit 208.

The general structure proposed according to an embodiment of the present invention in which the demodulator stage 218 is situated downstream from the rectifier and filter stages 210 and 212, has the advantage of reduced sensitivity to instantaneous variations in the signal.

With a portable object that is remotely powered, performing demodulation on a signal that has been rectified and filtered makes it possible to reduce the effects of instantaneous variations in the power supply during an oscillation cycle.

This aspect will be better understood from the detailed description of the operation of the demodulator given below with reference to the waveform diagrams of FIG. 8.

Figure 1:
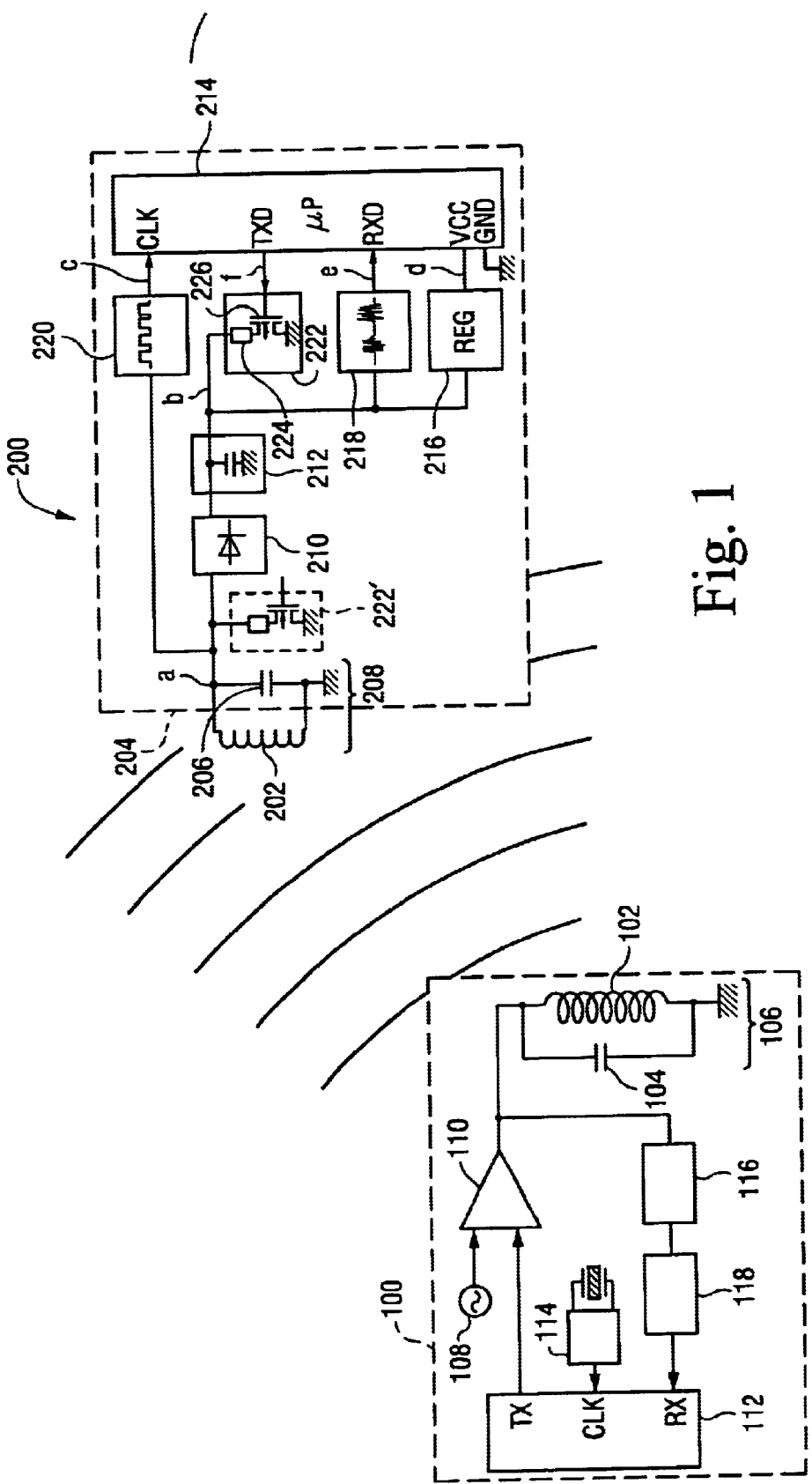
FIG. 1 is a block diagram of an exemplary embodiment of a system of the present invention including, comprising a terminal and a portable object in the field of the terminal.

An exemplary embodiment of the present invention of the structure shown in FIG. 1 is described below with reference to FIG. 2, which embodiment is characterized by a particular structure given to the regulator stage 216 which, as explained in greater detail below, is a stage of the "shunt regulator" type having a shunt component 228 serving to divert current in a controlled manner from the power supply to the digital circuit 214. The shunt component 228 is connected in parallel therewith between its power supply and ground terminals VCC and GND, the shunt component being associated with a series resistive element 230 placed in the power supply line VCC upstream from the regulator component 228.

The shunt 228 may advantageously be a zener diode, or preferably a separate or integrated component that is functionally equivalent to a zener diode, e.g., a component in the LM185/LM285/LM385 family from National Semiconductor Corporation, which component forms a reference voltage (a voltage that is fixed or adjustable depending on the component) while drawing a bias current of only 20 $\mu$A, having very low dynamic impedance and an operating current range of 20 $\mu$A to 20 mA. The component 228 may also be integrated in the ASIC as a monolithic equivalent of such a voltage reference component.

Figure 3:
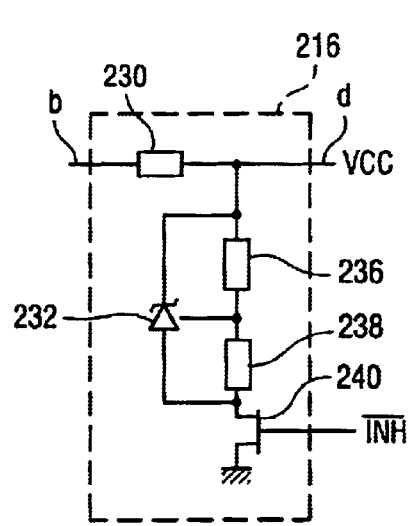
FIG. 3 shows an exemplary embodiment of the regulator circuit of FIG. 2 of the present invention.

FIG. 3 shows an exemplary embodiment of the present invention of this circuit 216 using a component of the type described above with its voltage reference input 234 being biased to a predetermined value by a divider bridge 236, 238 connected between VCC and ground.

The resistive element 230 may be a separate resistor or, advantageously, an integrated monolithic component, e.g., a MOS element acting as a resistance as for the component 224.

Advantageously, a switch component such as a MOS transistor 240 is also provided and maintained in the conductive state in normal operation by a signal $\overline{\text{INH}}$ being applied to its grid. This transistor can be switched to its non-conductive state by applying a simple control signal INH (specifically under software control from the computing circuit 214) having the effect of inhibiting operation of the shunt regulator, with the circuit then behaving as though the regulator had been omitted.

This ability to inhibit the shunt regulator can be used, in particular, when it is desired to power the microprocessor at a high voltage while avoiding the risk of destroying the regulator stage.

This situation arises in particular for test purposes, or when the portable object is a dual-mode object capable of being used selectively in a "contactless" mode (with the regulator in operation) or in "contact" mode (with the regulator inhibited), the regulated power supply voltage then being applied directly to one of the contacts of the portable object without there being any need to perform specific regulation as there is with remote powering.

The amplitude demodulator stage 218 is described below in greater detail with reference to FIGS. 4 to 6.

The amplitude demodulator is a circuit suitable for processing modulated signals in which the depth of modulation is low. The terms "low depth of modulation" or "low modulation" are used to mean modulation at a ratio that is typically less than or equal to 50%, and preferably less than 20%, with the "ratio" being defined as $(A_{max}-A_{min})/(A_{max}+A_{min})$ of the maximum and minimum amplitudes $A_{max}$ and $A_{min}$ of the signal under consideration.

In the particular context of a remotely powered portable object, it is advantageous, given power supply constraints, to use a low modulation ratio so as to ensure that sufficient power is available during periods when modulation is in the low state, since amplitude modulation has the effect of causing the instantaneous power that is delivered to the portable object to vary directly with modulation level.

FIG. 4 shows an exemplary embodiment of a first possible variant of the present invention in which the demodulator is an adaptive demodulator having a variable threshold.

After an optional lowpass filter stage 242, the circuit comprises a comparator 244, preferably having hysteresis, with its positive input receiving the signal b to be demodulated (where appropriate filtered by the stage 242) and whose negative input receives the same signal b, but after it has passed through an RC stage 246, 248 acting as an integrator. Comparison is thus performed between the instantaneous value of the signal and an averaged value of the signal which constitutes the variable comparison threshold.

FIG. 5 shows a second possible variant of the demodulator 218, which in this case is a demodulator that is sensitive to variations of amplitude.

After an optional lowpass filter stage 242, the signal b is applied to a CR stage 250, 252 acting as a differentiator. The signal output thereby is applied to the positive terminal of the comparator 244 (in this case likewise preferably having hysteresis) whose negative input is connected to a fixed potential, e.g., ground. In this case, the demodulator is responsive to variations in amplitude (because of the differentiator stage), independently of the mean value of the signal; the comparator only detects variations in the mean value.

FIG. 6 shows an exemplary embodiment of such a demodulator circuit of the present invention, or detecting variations in amplitude. In addition to the lowpass filter 242 constituted by the resistor 252 end the capacitor 254, there is a series capacitor 250 acting as a differentiator in combination with resistors 256 to 264. The signal differentiated in this way is applied to two symmetrical comparators 244 and 266 whose outputs act on two cross-coupled bistables 268 and 270 organized to produce two appropriately-shaped symmetrical signals RXD and $\overline{RXD}$.

FIG. 7 shows an exemplary embodiment of the clock detector and extractor circuit 220 of the present invention.

On its input, this circuit receives a signal taken from the terminals of the resonant circuit 208 and it is applied to the differential inputs of a comparator with hysteresis 272 which delivers the clock signal CLK. The clock signal is also applied to the two inputs of an EXCLUSIVE OR gate 274, directly to one of the inputs and via an RC circuit 276, 278 on the other input. The RC circuit applies a delay to the signal as picked up, which delay is chosen to have a time constant of the order of $\frac{1}{4}f_{CLK}$ (where $f_{CLK}$ is the frequency of the clock generated by the circuit 114 of the terminal 100). The output signal from the gate 274 is then averaged by an RC circuit 280, 282 having a time constant that is much greater than $\frac{1}{2}f_{CLK}$ (preferably about $1/f_{CLK}$) and is then applied to one of the inputs of a comparator 284 for comparison with a fixed threshold S.

The clock signal CLK serves to apply appropriate clocking to the digital processor circuit 214, while the output from the comparator 280 gives a signal PRSCLK indicating whether or not a clock signal is present.

For a dual-mode card suitable for operating equally well in a "contactless" mode and in a "contact" mode, the signal PRSCLK indicating whether the clock signal is present or absent is advantageously used to inform the digital circuit that the portable object is in a "contactless" type environment and to decide on corresponding actions such as selecting an appropriate communications protocol, and activating the shunt regulator, PRSCLX being used to generate $\overline{INH}$ (see description above with reference to FIG. 3), etc.

FIG. 11 shows in an exemplary embodiment the various switches of the present invention that are operated automatically in this way between a "contactless" mode and "contact" mode. The contacts 286 are as follows: CLK (clock), GND (ground), I/O (data), VCC (power supply), and $\overline{RST}$ (reset to zero), complying with the ISO 7816-3 standard, to which reference can be made for further details. The various switches 288 to 296 are all shown in the "contact" position (referenced "0") which is the default position, and they are changed over to the "contactless" position (referenced "1") under the control of the signal PRSCLK delivered by the circuit 220 and indicating that a clock signal is present coming from the rectifier and filter means.

Extraction of a clock signal is also particularly advantageous when it is desired to perform modulation that is not in baseband, but in subcarrier modulation, since the subcarrier is easily generated by dividing the frequency of the clock. The digital circuit 214 then adds the subcarrier to the data for transmission in order to produce the signal TXD which is applied to the load modulator circuit 222.

The operation of the portable device is described below with reference to the waveform diagrams of FIGS. 8 to 10.

The description begins with reference to the diagrams of FIG. 8 by explaining how the object is powered and how it recovers the clock signal.

The tuned circuit 208 picks up a portion of the magnetic energy produced by the terminal. The corresponding alternating signal a shown in FIG. 8 is rectified by the block 210 and filtered by the capacitor 212 to give a rectified and filtered voltage b as shown in FIG. 8. For an alternating signal a having a peak voltage of 10 V, a rectified and filtered voltage is obtained that has a peak voltage of about 8.5 V. Naturally, the amplitude of the voltage a, and thus of the voltage b, depends greatly on the distance between the object and the terminal, with amplitude increasing as the object comes closer to the terminal. The regulator stage 216 acts to compensate for such variations, by delivering a stable voltage to the digital circuit 214, typically of the order of 3 V (waveform d in FIG. 8).

Thus, when rather far away from the terminal, practically at the edge of its range, the voltage b will be fairly close to the required value of 3 V, and the voltage drop between b and d will be small, the current passing through the shunt 228 also being very small and substantially all of the current delivered by the power supply circuit will be used for powering the digital circuit 214. It will be observed that under such circumstances the current flowing through the shunt 228 can be as low as only a few microamps (minimum bias current).

In contrast, when the object is very close to the terminal, the voltage b will be high, and the potential difference between b and d will also be large (several volts), so the current flowing through the shunt 228 will be high, the resistive elements 230 and the shunt 228 then dissipating the excess power.

In addition to its purely electrical function of stabilizing the power supply to the digital circuit 214, the shunt regulator stage provides several advantages in the context of the circuit described above.

Firstly, it makes it possible to limit the excursion of the voltage at b, and thus at a, when the object is close to the terminal, because of the low load which is presented downstream from the tuned circuit 208: because of the large current flowing through the shunt 228, the power that is picked up and that is not required for powering the digital circuit 214 Is entirely dissipated in the form of heat.

This is particularly advantageous when the capacitor 206 of the tuned circuit 208 is an element implemented in integrated monolithic technology, since this avoids any risk of the capacitor breaking down due to excess voltage. Given the geometrical constraints on the integrated circuit, it is not possible to make capacitors having high breakdown voltages. Unfortunately, the digital circuit 214 which is built around a microprocessor, requires a relatively large supply of power, and thus quite a high level of magnetic field which in turn is capable of generating excess voltages in the tuned circuit unless the precautions mentioned are taken.

Secondly, the shunt regulator has the effect of smoothing instantaneous variations in the power supply current to the digital circuit (the power consumption of such a circuit is not constant) and of avoiding them having repercussions on the operation of other members of the circuit for communication either from the object to the terminal or from the terminal to the object. Undesirable variations in current or voltage can give rise to errors in modulation or in demodulation.

Finally, when the object is at an extreme range from the terminal, and thus receives only just enough signal from the terminal for powering the digital circuit, the design of the circuit serves to avoid wasting any power, since the current flowing through the shunt 220 is practically zero. Thus, all of the power picked up by the tuned circuit is available for use in powering the digital circuit.

The clock extractor circuit 220 serves to transform the alternating circuit a picked up across the terminals of the tuned circuit 208 into a series of properly shaped clock pulses c.

The way in which information is transmitted from the terminal to the object is described below with reference to the waveform diagrams of FIG. 9.

To transmit information to the object, the terminal modulates the amplitude of the magnetic field that it produces. Since the information is transmitted in binary form, this modulation amounts to reducing the amplitude of the signal by a predetermined amount, e.g., 10%. Such a reduction corresponds, for example, to sending a logic "0", with an amplitude remaining at its maximum for a logic "1": this can be seen in FIG. 9 for the waveform diagram a of the signal as picked up by the tuned circuit 208.

After rectifying and filtering, this gives rise at b to a decrease in the amplitude of the rectified and filtered signal. This decrease in amplitude is detected by the amplitude demodulator 218 which outputs the logic signal which is applied to the digital circuit.

It will be observed that the decrease in amplitude that results from modulation of the signal transmitted by the terminal has no effect on the clock extractor (signal c) or on the power supply voltage delivered to the digital circuit (signal d).

If techniques other than amplitude modulation are used in the terminal→object direction, e.g. phase modulation as taught in numerous prior art documents, then the type of modulation would have no direct incidence on the operation of the regulator circuit of the invention; nevertheless, this circuit is particularly advantageous when amplitude modulation is used, since, as explained, it is entirely capable of countering the various drawbacks associated with choosing the amplitude modulation technique.

The way in which information is transmitted in return from the object to the terminal is described below with reference to the waveform diagrams of FIG. 10.

As mentioned above, in the embodiment shown, transmission is performed by load variation, i.e., by controlled variation of the current drawn by the tuned circuit 208. To this end, the resistive element 224 is selectively switched into the circuit by the component 226, being in circuit, for example, when a logic "0" is to be sent, and being out of the circuit for a logic "1".

When the resistor is in circuit, i.e., for a logic "0", the voltage a drops because of the additional load. The resistance of the resistor is naturally selected so that this voltage drop nevertheless enables proper power supply to the digital circuit to be conserved.

Nevertheless, there may be difficultly when at an extreme range from the terminal. Under such circumstances, the current that needs to be diverted through the resistive element 224 to generate the modulation may be too high to allow the digital circuit to continue operating properly.

Under such circumstances, it is advantageous to make provision, before the object begins to send information to the terminal, for the digital circuit to be placed in a "low consumption" mode so as to be able to consume more current in the resistive element 224 without compromising the supply of power to the digital circuit.

This can be achieved, for example, by the program of the microprocessor in the digital circuit which, before beginning to send data to the terminal, places the transmission routine in RAM (which consumes little power on being accessed) and disconnect the EPROM (which consumes considerably more power on being accessed). In other words, the digital circuit is put into "low consumption" mode so as to make a large amount of current available, which current is then consumed in the modulation resistor for sending messages to the terminal.

Also, if more modulation current can be passed through the resistive element 224 (by giving it a lower resistance), then the modulation will be perceived better by the terminal, thus making it possible at the terminal to make do with detector means that are less elaborate and/or providing a better signal/noise ratio.

It is possible, since in the object→terminal direction, to use other types of modulation or variants, e.g., as mentioned above, modulation of a subcarrier which controls load variation instead of modulating the load directly by the signal that is to be transmitted.

What is claimed is:
1. A system for exchanging data, the system comprising:
at least one terminal;
a plurality of portable objects cooperating with the at least one terminal by contactless communication;
wherein the contactless communication is a communication in which an operation of at least one of the plurality of portable objects is clocked by a clock signal remotely generated by the at least one terminal;
wherein the at least one terminal includes a first tuned circuit having a first coil for emitting a magnetic field in free space, a first data transmitter cooperating with the first coil, the first data transmitter including an alternating signal generator and an amplitude modulator, a first data receiver cooperating with the first coil, and a clock generator for generating the clock signal;

wherein the amplitude modulator of the at least one terminal provides amplitude modulation of the magnetic field emitted by the at least one terminal at a modulation ratio less than or equal to 50%, wherein the at least one of the plurality of portable objects includes an electric circuit remotely powered by the at least one terminal, the at least one of the plurality of portable objects including:

a second tuned circuit having a second coil for at least one of interacting with the magnetic field emitted by the at least one terminal and producing a response by a modulated disturbance of a magnetic field, a converter cooperating with the second coil to transform a magnetic field signal induced in the second coil into a DC voltage for powering the electric circuit, the converter including a rectifier stage and a filter stage, a second data transmitter and a second data receiver cooperating with the second coil, the second data receiver including a demodulator demodulating an amplitude of the magnetic field signal induced in the second coil, the demodulator operating on a second signal output from the rectifier stage and the filter stage;

digital processor; and a clock detector and extractor circuit for receiving a signal from the second tuned circuit and for extracting the clock signal and outputting the clock signal to the digital processor for clocking the digital processor.

2. The system according to claim 1, wherein the modulation ratio of the at least one terminal is less than 20%.

3. A portable object for contactless communication with a terminal, the portable object including an electronic circuit remotely powered by the terminal;

wherein the contactless communication is a communication in which an operation of the portable object is clocked by a clock signal remotely generated by the terminal;

wherein the portable object comprises:

a first tuned resonant circuit having a first coil for at least one of interacting with a modulated magnetic field emitted by the terminal and producing a response by a modulated disturbance of a magnetic field, the first tuned resonant circuit radiating the magnetic field in free space;

a converter cooperating with the first coil to transform a modulated magnetic field signal induced in the first coil into a DC voltage for powering the electronic circuit, the converter including a rectifier stage and a filter stage;

a data transmitter cooperating with the first coil; and a data receiver cooperating with the first coil, the data receiver including a demodulator demodulating an amplitude of the modulated magnetic field signal induced in the first coil, and wherein the demodulator operates on a second signal output from the rectifier stage and the filter stage; and wherein the portable object further comprises:

digital processor, and clock detector and extractor circuit for receiving a signal from the first tuned circuit and for extracting the clock signal and outputting the clock signal to the digital processor for clocking the digital processor.

4. The portable object according to claim 3, wherein the demodulator includes a variable threshold circuit comparing an instantaneous value of the second signal applied to an input of the variable threshold circuit with a mean value of the second signal.

5. The portable object according to claim 3, wherein the demodulator includes a circuit responsive to a rate at which an instantaneous value of the second signal increases.

6. The portable object according to claim 3, wherein the converter further includes a stabilizer stage disposed downstream from the rectifier stage and the filter stage, the stabilizer stage including a shunt regulator element connected in parallel with power supply terminals of the electronic circuit, a resistive component being connected in series with a power supply line of the electronic circuit, wherein the shunt regulator element dissipates a variable fraction of a power supply current, and wherein the resistive component and the shunt regulator element dissipate power not required for an operation of the electronic circuit and thereby a power supply voltage at the power supply terminals is stabilized, a voltage excursion at a terminal of the first tuned resonant circuit is limited and an influence on the amplitude of the demodulated magnetic field signal is isolated film a variation in current consumption.

7. The portable object according to claim 6, further comprising a shunt regulator switch for selectively and temporarily inhibiting an operation of the shunt regulator element.

8. The portable object according to claim 7, further comprising a detector capable of detecting at least one of the contactless communications and a contact communication, wherein the selective and temporary inhibition of the operation of the shunt regulator element is in response to detecting the contact communication.

9. The portable object according to claim 3, wherein at least a portion of the first tuned resonant circuit, the converter, the data transmitter, the data receiver and the digital processor are implemented in an integrated monolithic technology.

10. The portable object according to claim 3, wherein the data transmitter further includes a modulator stage modulating a current consumption downstream of the first tuned resonant circuit and wherein the electronic circuit operates in one of a nominal power consumption mode and a low power consumption, the electronic circuit being placed into the low power consumption mode before operation of the data transmitter modulation stage.

* * * * *